United States Patent [19]
Walsh

[11] Patent Number: 5,154,548
[45] Date of Patent: Oct. 13, 1992

[54] DOWELLING FIXTURE

[76] Inventor: Joseph P. Walsh, 8638 Cromwell Rd., Springfield, Va. 22151

[21] Appl. No.: 766,397

[22] Filed: Sep. 27, 1991

[51] Int. Cl.⁵ .................. B23B 47/28; B23B 49/02
[52] U.S. Cl. .................. 408/72 R; 408/115 R; 408/241 B
[58] Field of Search ............... 408/72 R, 72 B, 115 R, 408/115 B, 241 B; 33/628, 638

[56] References Cited

U.S. PATENT DOCUMENTS

| | | |
|---|---|---|
| 10,092 | 10/1853 | Dean . |
| 1,161,479 | 11/1915 | Kelley ................. 408/109 |
| 1,412,087 | 4/1922 | Ottinger ............. 408/115 R |
| 1,712,453 | 1/1926 | Bieder . |
| 2,341,107 | 2/1944 | MacDonald ......... 408/115 R |
| 2,428,201 | 6/1945 | Cannarili et al. ..... 408/72 R |
| 2,798,520 | 3/1955 | Maskulka et al. . |
| 2,804,788 | 9/1955 | Humphrey ........... 408/115 R |
| 2,838,966 | 6/1958 | Campbell ............. 408/115 R |
| 3,008,359 | 11/1961 | Mackey .............. 408/115 R |
| 3,241,453 | 3/1966 | Baldwin . |
| 3,708,237 | 1/1973 | Kruse ................ 408/115 R |
| 4,145,160 | 3/1979 | Wiggins .............. 408/103 |
| 4,153,384 | 5/1979 | Isaken ............... 408/115 R |
| 4,176,989 | 12/1979 | Wolff ............... 408/115 R |
| 4,377,357 | 3/1983 | Butera .............. 408/115 R |
| 4,421,442 | 12/1983 | Lindblad ............ 408/115 R |
| 4,448,572 | 5/1984 | Gill ................. 408/115 R |
| 4,461,603 | 7/1984 | Klee et al. .......... 408/115 R |
| 4,474,514 | 10/1984 | Jensen ............... 408/115 R |
| 4,492,498 | 1/1985 | Kaufman ............ 408/115 R |
| 4,522,539 | 6/1985 | Gibbs ............... 408/72 R |
| 4,583,889 | 4/1986 | Fallon .............. 408/115 R |
| 4,594,032 | 6/1986 | Warburg ............. 408/115 R |
| 4,602,898 | 7/1986 | Brown et al. ........ 408/115 R |
| 4,684,299 | 8/1987 | Laliberte ........... 408/115 R |
| 4,730,959 | 3/1988 | Aerni et al. ........ 408/115 R |
| 4,752,162 | 6/1988 | Groh ............... 408/115 R |
| 4,793,747 | 12/1988 | Reitz ............... 408/115 R |
| 4,834,593 | 5/1989 | Fallon .............. 408/115 R |
| 4,865,496 | 9/1989 | Challis ............. 408/115 R |
| 4,893,970 | 1/1990 | Becraft ............. 408/72 R |
| 4,923,340 | 5/1990 | Hegedusch .......... 408/72 R |

Primary Examiner—Steven C. Bishop
Attorney, Agent, or Firm—Stevens, Davis, Miller & Mosher

[57] ABSTRACT

This invention relates to fixtures which aid in the drilling of holes for dowels and pegs. In particular, this invention relates to fixtures which aid the user in accurately positioning and guiding a drill or other boring tool into a workpiece and is of special utility in those situations in which the position of matched hole locations in adjoining or adjacent workpieces are critical. A drilling fixture is proposed which incorporates a body member and at least one perpendicular leg member wherein the leg member has a longitudinal stepped slot formed in it to receive a drill guide.

The drill guide is fully adjustable along the length of the longitudinal stepped slot and may be locked in the desired location with a locking nut. The drill guide is an externally threaded cylindrical element with a flanged base and a longitudinal bore for receiving a drill bit. Alternatively, the longitudinal bore may include a counterbored end opposite the flanged end of the cylindrical element and be sized to accept drill bushings to provide use with a variety of sizes of drill bits.

19 Claims, 5 Drawing Sheets

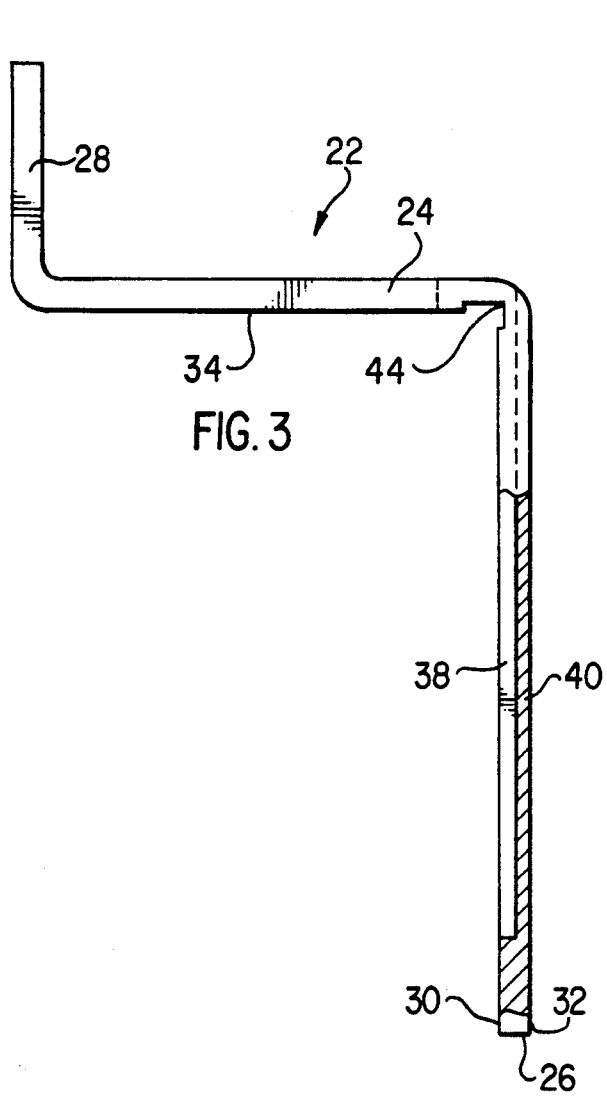
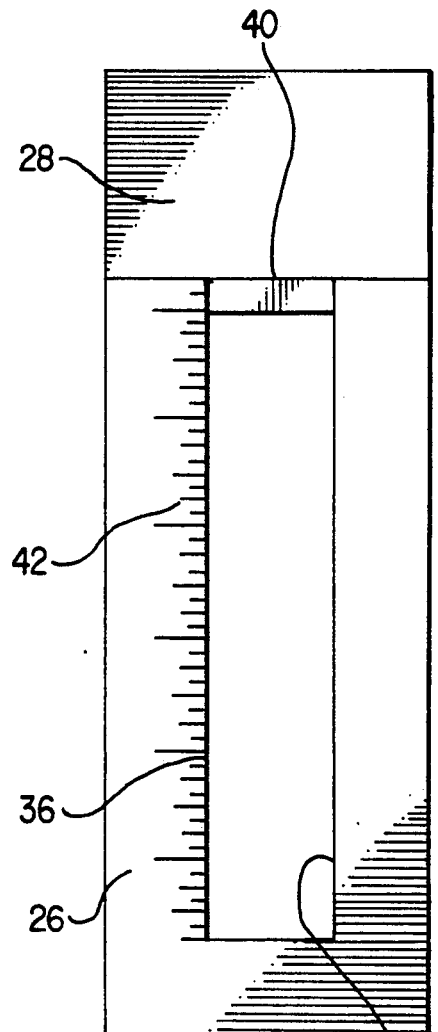
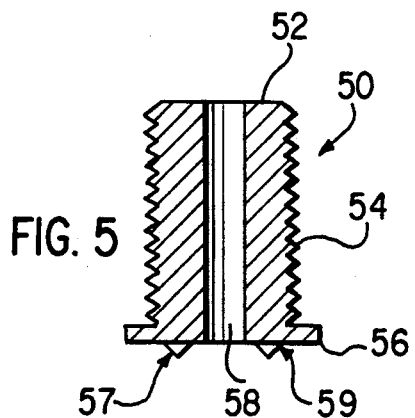
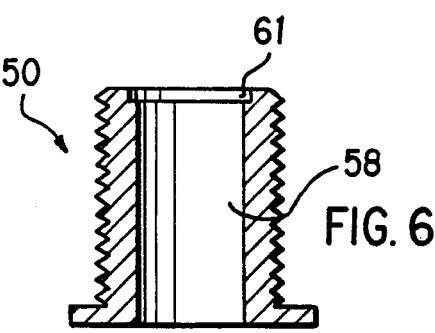

DOWELLING FIXTURE

FIELD OF THE INVENTION

This invention relates to fixtures which aid in the drilling of holes for dowels and pegs. In particular, this invention relates to fixtures which aid the user in accurately positioning and guiding a drill or other boring tool into a workpiece in which the position of matched hole locations in adjoining or adjacent workpieces are critical.

BACKGROUND OF THE INVENTION

It is common to join workpieces, such as boards or, more generally, lumber or even metal or plastics, in a variety of configurations using dowels or pegs to ensure proper alignment of adjacent surfaces as well as to increase the strength of the joint being formed. Using examples and terminology most common to the wood craftsman, but without so limiting the use of the present invention, this technique of joining workpieces with the aid of dowels or pegs is often used to produce a wide board from a plurality of smaller width boards, or to produce mitered corner joints, or to produce plain corner joints, or to form T-shaped joints. This general technique may also be employed to produce adjustable shelves where each shelf is supported by a plurality of pegs inserted into corresponding sets of holes drilled into the faces of opposing vertical sides of a cabinet.

The common problem to be solved in all of the above cases is the precise positioning and/or alignment of adjoining holes required to produce flat boards, perpendicular joints or level shelves. A common method of matching the positions of holes is to measure and mark each location by hand. This method, however, is highly inaccurate because two measurements must be made to describe the location of each hole on each adjoining workpiece. Additionally, those skilled in the art know that measurement errors may be multiplied if the location of both of a set of matching holes are measured and marked incorrectly.

For this reason, a variety of fixtures have been developed which enable the craftsman to produce acceptable and repeatable results. These fixtures, however, are either complicated to use and/or expensive to manufacture or are structured in a rigid, non-adjustable fashion exhibiting diminished utility.

U.S. Pat. Nos. 4,145,160, 4,153,384 and 4,377,357 are representative of the more complicated fixtures previously developed. These fixtures are composed of several parts. Furthermore, use of these fixtures requires care and thought as complicated clamping schemes form a part of their structure. This also increases the time required to set up the fixtures. In addition, these fixtures are limited in their use, because of preset hole sizes and hole placement, i.e., the user can perform drilling applications on a limited number of sizes of articles and at a limited number of locations on a particular article.

U.S. Pat. Nos. 4,421,442 and 4,730,959 present fixtures which, although relatively easy to use, are limited in their application. These fixtures, practically speaking, may be used only for drilling holes into the edge of a board. Furthermore, the size hole is fixed as is the location or depth of the hole with respect to a face of the workpiece.

U.S. Pat. Nos. 2,798,520 and 4,893,970 are directed to drill fixtures which are uncomplicated but which are severely restricted in their use. Neither of these devices provides for use of different size drills nor is there any means for varying the depth at which the hole may be bored. Additionally, although these fixtures may be used to drill holes in the face of a board, the user must still rely on hand measurements to position the tool, unless the holes are to be drilled at the fixed depth from an edge of the board provided by the design of the tool. The disclosure of each of the above mentioned U.S. Patens are herein incorporated, in their entirety, by reference.

OBJECTS OF THE INVENTION

It is, therefore, an object of the present invention to provide a device to aid the user in accurately positioning and guiding a drill for drilling dowel or other holes which overcomes the deficiencies of the prior art by being inexpensive to manufacture and easy to use.

It is a further object of this invention to provide a device which may be utilized, with acceptable accuracy, for both edge drilling and face drilling.

It is also an object of the present invention, to provide a device which may be adjusted to allow drilling at nearly any depth location with respect to an edge or face surface of a board.

Furthermore, it is intended to provide a device which may be used with a variety of different types of drill bits including paddle drills, "hole saws" and other similar drill bits with large cutting diameters but small shank diameters. The disclosed device would provide all of the benefits noted above a well as provide a fixture for producing accurate results when performing such operations as drilling holes for door knob hardware or peg placement for adjustable shelves.

SUMMARY OF THE INVENTION

In order to provide a drilling fixture which is easy to use, inexpensiye to manufacture, suitable for both edge drilling and face drilling, adjustable to allow drilling at nearly any depth location and which may be used with a variety of different types of drill bits, a drilling fixture is proposed which incorporates a body member and at least one perpendicular leg member wherein the leg member has a longitudinal stepped slot formed in it to receive a drill guide.

The drill guide is fully adjustable along the length of the longitudinal stepped slot and may be locked in the desired location with a locking nut. The drill guide is an externally threaded cylindrical element with a flanged base and a longitudinal bore for receiving a drill bit. Alternatively, the longitudinal bore may include a counterbored end opposite the flanged end of the cylindrical element and be sized to accept drill bushings to provide use with a variety of sizes of drill bits.

BRIEF DESCRIPTION OF THE SEVERAL VIEWS OF THE DRAWINGS

FIG. 3 is a side view of the dowel jig plate.

FIG. 4 is a front view of the dowel jig plate.

FIG. 5 is a sectional view of the drill guide.

FIG. 6 is a sectional view of the drill guide adapted for use with a drill bushing.

DETAILED DESCRIPTION OF THE INVENTION

Figure 1:
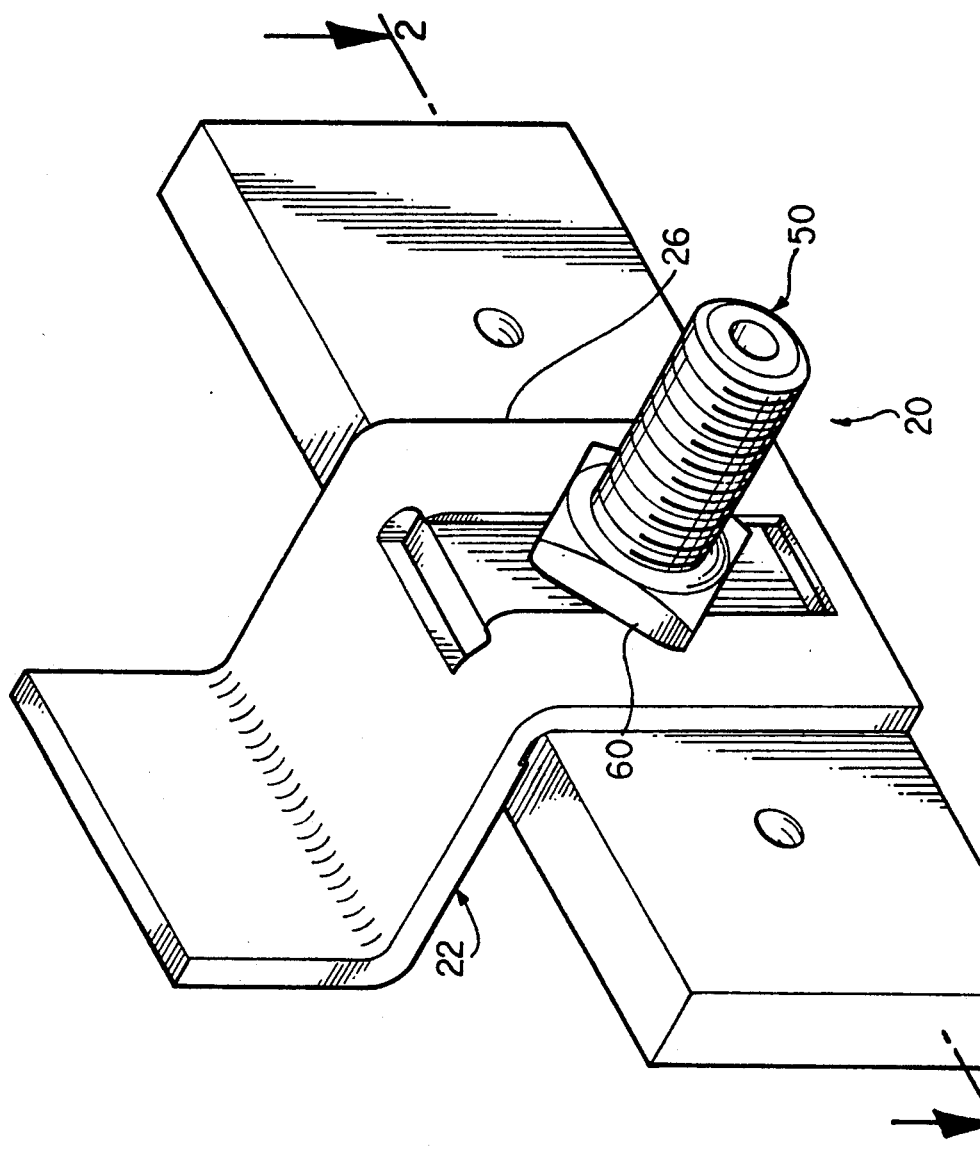
FIG. 1 is a perspective view of the first embodiment of my invention as it might be used to drill a hole in a workpiece.

The dowelling fixture 20 of the present invention is generally shown in FIG. 1. It is composed of two main elements, a dowel plate 22 and a drill guide 50.

As shown in FIG. 3, the dowel jig plate 22 is comprised of a body member 24 and two leg members 26 and 28 integral to the body member. Preferably, the two leg members 26 and 28 extend from the body member 24 in opposite directions. Although opposite extension is not essential, the first leg member 26 must have an inside surface 30 substantially parallel to an outside surface 32 and these surfaces must be perpendicular to the inside surface 34 of the body member 24. Said first leg member 26 is further characterized by a longitudinal stepped slot 36 and may also include a measuring scale 42 or other indicia etched or imprinted along the length of the longitudinal stepped slot 36.

Figure 2:
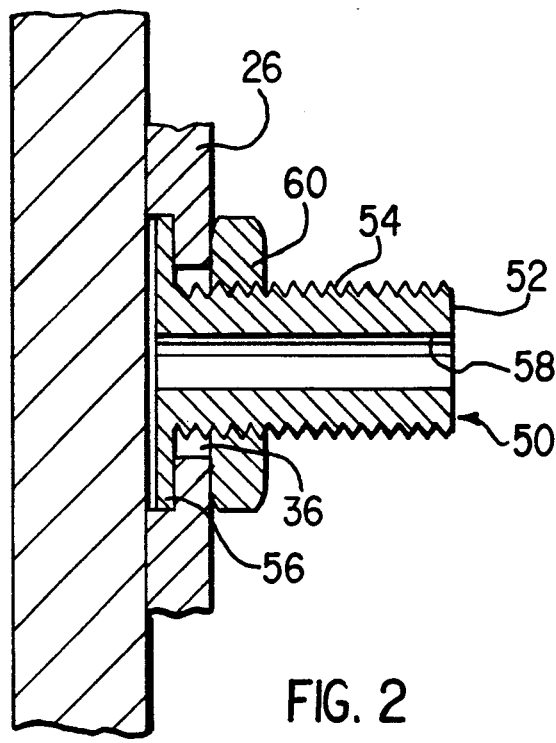
FIG. 2 is a sectional view taken along line 2—2 of FIG. 1 showing the interrelation between the elements of the invention.

Said longitudinal stepped slot 36 includes a slot 38 formed through the thickness of said first leg member 26 and a step 40 of intermediate depth formed from the inside surface 30 of said first leg member 26. The longitudinal stepped slot 36 is of sufficient proportions to accept the drill guide 50 in slidable relation therewith substantially as shown in FIG. 1. FIG. 2 is a sectional view taken along the line 2—2 of FIG. 1 and shows the interrelation between the first leg member 26, the longitudinal stepped slot 36, and the drill guide 50.

Said stepped slot begins at the intersection of the body member 24 and the first leg member 26 and extends through said body member 24 so as to form the opening 42. Said longitudinal stepped slot 36 extends along said first leg member 26 but terminates at a point A intermediate of the full length of said first leg member 26.

During use of the dowelling fixture, the inside surfaces 30 and 34 of the first leg member 26 and the body member 24 respectively must lie flat against a workpiece. Therefore, it is necessary that the inside corner 44 formed between the body member 24 and the first leg member 26 be sharp (or recessed substantially as shown in FIG. 3) to accommodate a corner of the workpiece.

The second leg member 28 extending from the body member 24 acts as a hand hold for the user to apply pressure to the dowelling fixture to maintain it in position during use.

Although the dowel jig plate may be made of suitable metal, plastic or composite materials, it is preferably made from a clear plastic material such as LEXAN® sheet or other clear material suitable for the desired use and method of forming. The dowel jig plate 22 may be formed by cutting kerfs into a planar sheet of transparent plastic material and heating the sheet to soften it, followed by or simultaneous with bending the sheet into the shape as shown in the drawings. The dowel jig plate 22 may also be formed directly into its finished shape by compression or injection molding. Additionally, the first leg member 26 may be imprinted or etched with a measuring scale 42 or other indicia for positioning the drill guide 50. Such a scale 42 would preferably have a zero at a position corresponding to the inside surface 34 of the body member 24 so as to correspond to a convenient datum surface of a workpiece. Alternatively, other indicia may be provided such as indicia to locate the center of standard thickness lumber.

As shown in FIGS. 1 and 2 the drill guide 50 comprises a cylindrical body portion 52 which is externally threaded 54 along its length to accept a locking nut 60. Integral to said body portion 52 is a flanged base 56. Flanged base 56 may be suitably joined to both portion 52 in any suitable manner, i.e., a mating thread, welding, or being formed unitary with body portion 52. The body portion 52 also has a longitudinal bore 58.

The flanged base 56 may be substantially of any size and shape. A preferred shape, however, would be flat sided, e.g., square or hexagonal. The diameter or length across the flats of the flanged base 56 must be greater than the diameter of the body portion 52 but slightly less than the width of the step 40 of the longitudinal stepped slot 36 formed in the first leg member 26. Additionally, the thickness of the flanged base 56 should be less than the depth of the step 40 so that a flat surface 30 is maintained to be butted against a workpiece.

Figure 2A:
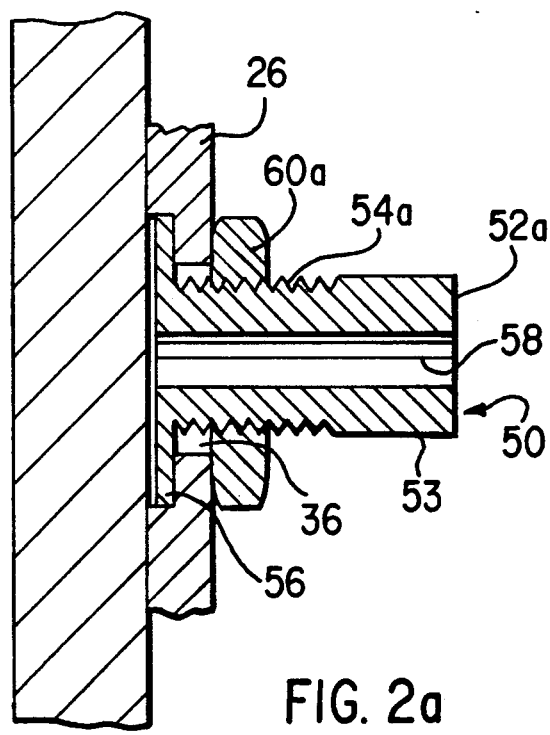
FIG. 2a is an alternative embodiment of the invention illustrated in FIG. 2.

As shown in the alternative embodiment of drill guide 50 illustrated in FIG. 2a (wherein like parts are denoted by the same reference numerals), body portion 52a is only partially threaded 54a so as to receive locking nut 60a between flanged base 56 and the unthreaded stock 53 of body portion 52. The unthreaded stock may be of dimension smaller than or larger than the outside diameter of the threaded portion.

In any of the embodiments illustrated in the drawings, flanged base 56 may be provided with sharpened protuberances or points 57, 59 (FIG. 5) for the purpose of biting into the workpiece.

The longitudinal bore 58 in the body member 52 may be of a single preset size, as shown in FIG. 5, for use with one size drill bit or may be of a large diameter with a counterbore 61, as shown in FIG. 6, to accept a conventional drill bushing for use with a variety of different size drill bits.

The drill guide 50 is preferably made of any suitable metal, such as steel, and may be formed by machining or casting. The top face of the flanged base 56 may also be provided with a score mark (not shown), which corresponds with the center of the longitudinal bore and may be aligned with the markings of the measuring scale 42 or other indicia etched or imprinted on the first leg member 26 of the dowel jig plate 22. In this respect the flanged base 56 of the drill guide 50 would be larger than the locking nut 60 to allow the user to see the score mark while adjusting the drill guide 50 and tightening the locking nut 60.

In use, the user would first determine the position at which the hole is to be drilled. This would necessarily include the depth location of the hole with respect to a reference or datum surface of a workpiece. The user would then slide the drill guide 50 in the longitudinal stepped slot 36 of the dowel jig plate 22 and lock it into position with the locking nut 60 at the desired location. The dowelling fixture 20 is then butted against the workpiece and held in position while the hole is drilled. The dowelling fixture 20 and method for its use described above is suitable for drilling holes into an edge or a face of a workpiece with a standard twist drill. In order to use drills with a large cutting head but a relatively smaller shank diameter, such as a paddle drill or a hole saw, a second embodiment 70 of the present invention is contemplated.

Figure 7:
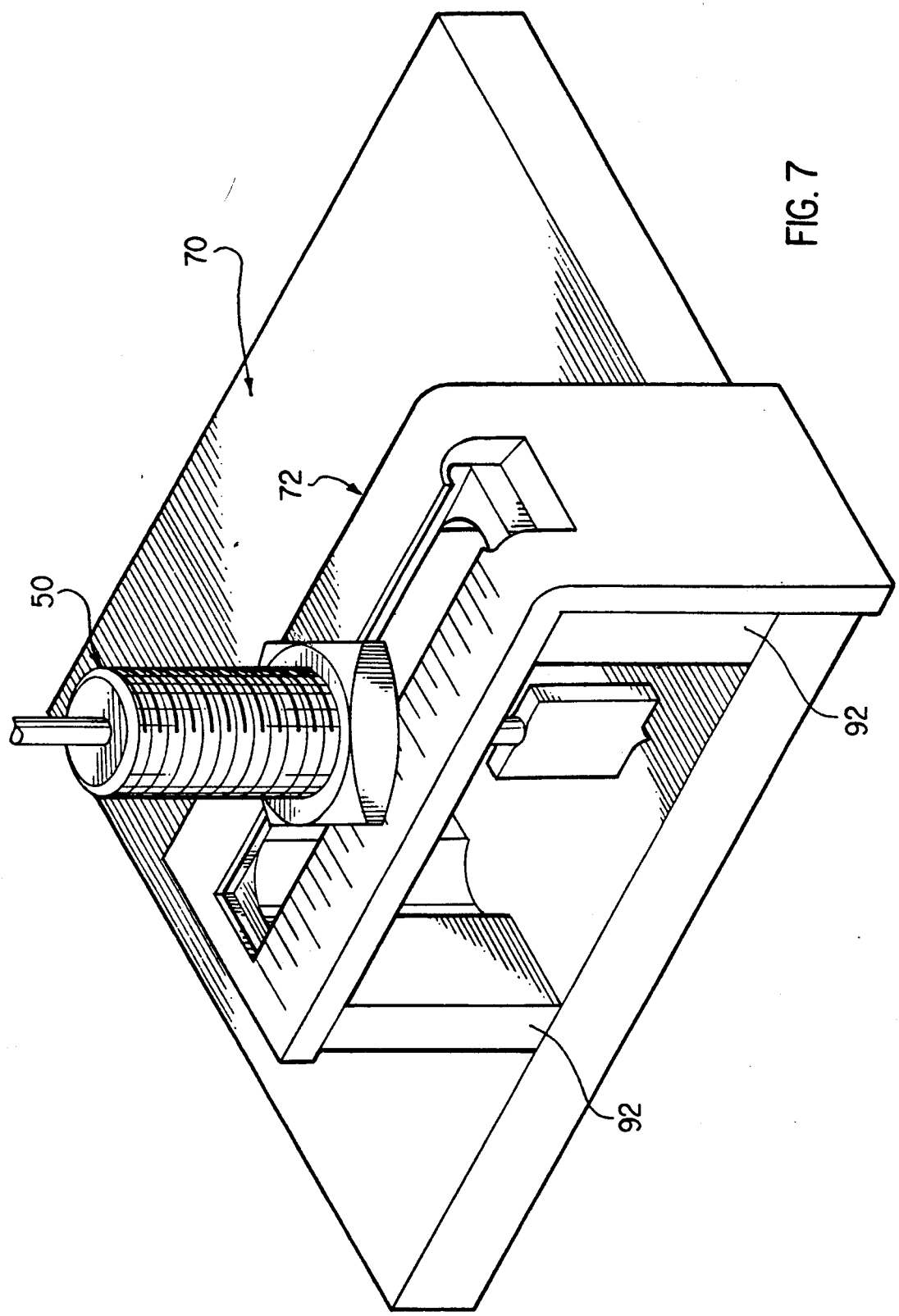
FIG. 7 is a perspective view of an alternate embodiment of my invention which is particularly suited for use with drill bits which have large cutting diameters but relatively small shanks.

The second embodiment 70 of the present invention is shown in FIGS. 7-10. As shown in FIG. 7, the main elements of this embodiment of the dowelling fixture 70 include the dowel jig plate 72, the support blocks 92 and the drill guide 50.

Figure 8:
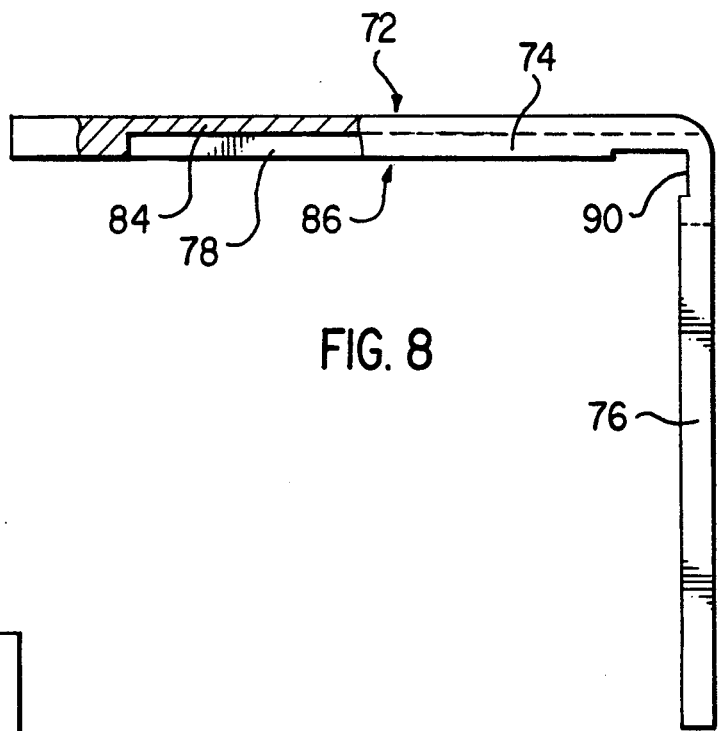
FIG. 8 is a side view of the alternate embodiment of the dowel jig plate.
Figure 9:
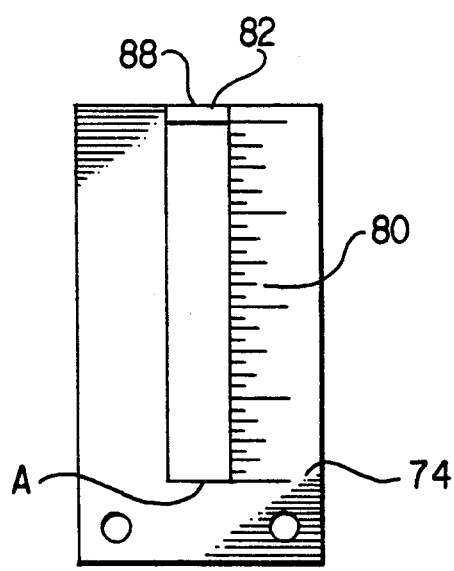
FIG. 9 is a top view of the alternate embodiment of the dowel jig plate.
Figure 10:
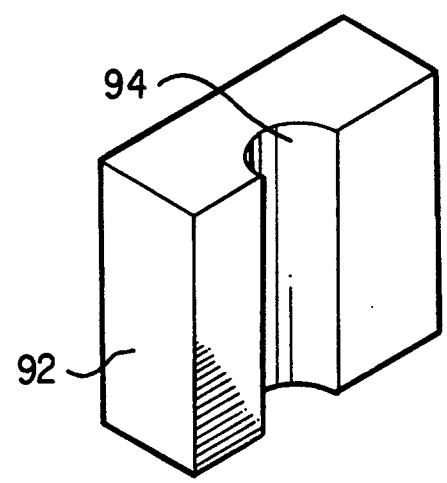
FIG. 10 is a perspective view of the support blocks to be used in with the alternate embodiment of the dowel jig plate.

Referring to FIG. 8, the dowel jig plate 72 is comprised of two leg members 74 and 76 formed so as to be perpendicular to each other. The first leg member 74 is further characterized by a longitudinal stepped slot 78 and may also include a measuring scale 80 etched or imprinted along the length of the longitudinal stepped slot 78.

Said longitudinal stepped slot 78 includes a slot 82 formed through the thickness of said first leg member 74 and a step 84 of intermediate depth formed from the inside surface 86 of said first leg member 74. The longitudinal stepped slot 78 is of sufficient proportions to accept the drill guide 50 in slidable relation therewith substantially as shown in FIG. 7. The interrelation of the first leg member 74, the longitudinal stepped slot 78 and the drill guide 50 is substantially the same as depicted in FIG. 2 for the first embodiment of the present invention.

Said longitudinal stepped slot 78 begins at the intersection of the first and second leg members 74 and 76 and extends through said second leg member 76 so as to form the opening 88. Said longitudinal stepped slot 78 extends along said first leg member 74 but terminates at a point A intermediate to the full length of said first leg member 74.

The inside corner formed between the first and second leg members 74 and 76 should be sharp (or recessed as shown at 90) to allow proper alignment of the support block 92.

The support blocks 92 are substantially box-like. They are used to support the dowel jig plate 72 above the work area to provide clearance for the large size drill head. These supports preferably have a round channel 94 formed along their length to provide additional diametrical clearance for the large size drill heads.

The dowel jig plate 72 is preferably made from a clear plastic material such as LEXAN ® sheet or other clear material suitable for the desired use and method of forming. The dowel jig plate 72 may be formed by cutting kerfs into the sheet and heating the sheet to soften it, followed by or simultaneously with bending the sheet into the shape as shown in the drawings. The dowel jig plate 72 may also be formed directly into its finished shape by compression or injection molding. Additionally, the first leg member 74 may be imprinted or etched with a measuring scale 80 for positioning the drill guide 50. Such a scale would preferably have a zero at a position corresponding to the inside surface 86 of the first leg member 74 so as to correspond to a convenient datum surface of a workpiece.

To use this dowelling fixture 70, the user would determine the position of the hole to be drilled in the workpiece and lock the drill guide 50 into position along the longitudinal stepped slot 78 of the first leg member 74. The drill would then be inserted through the drill guide, connected to the drill and the hole would then be drilled.

Those skilled in the art will realize that the invention described above may be used in a variety of applications other than those described above. It is also understood that the embodiments described above are merely examples of the present invention. Additional embodiments may be devised by those skilled in the art without departing from the spirit or scope of the invention.

What I claim is:

1. A dowelling fixture, comprising:
   a dowel jig plate having a body member and first and second integral leg members oppositely extending from said body member;
   a longitudinal stepped slot in said first leg member;
   a substantially 90° angle at the inside surface of the corner formed between said body member and said first leg member; and
   means for guiding a drill bit, said means for guiding permitting slidingly adjustable movement of said means for guiding within said longitudinal stepped slot and means for locking said means for guiding in position relative to said dowel jig plate.

2. The dowelling fixture of claim 1, further comprising:
   a measuring scale affixed to and parallel with said longitudinal stepped slot of said first leg member.

3. The dowelling fixture of claim 2, wherein:
   said measuring scale has a zero position corresponding to the inside surface of said body member.

4. The dowelling fixture of claim 1, wherein the dowel jig plate is formed of a transparent plastic material.

5. The dowelling fixture of claim 1, wherein the inside surface of the corner formed between said body member and said first leg member is undercut.

6. The dowelling fixture of claim 1, wherein the means for locking comprising a locking nut cooperating with threads found on the exterior of said means for guiding.

7. A dowelling fixture, comprising:
   a dowel jig plate having first and second integral leg members arranged perpendicularly;
   a longitudinal stepped slot in said first leg member;
   a substantially 90° angle at the inside surface of the corner formed between said first and second leg members;
   two support blocks for supporting said dowel jig plate from the underside; and
   means for guiding a drill bit which is slidingly adjustable within said longitudinal stepped slot and may be locked in position with a locking nut.

8. The dowelling fixture of claim 7, wherein:
   said support blocks have a round channel in one face along the height of the block.

9. The dowelling fixture of claim 7, further comprising:
   a measuring scale affixed to and parallel with said longitudinal stepped slot of said first leg member.

10. The dowelling fixture of claim 9, wherein:
    said measuring scale has a zero position corresponding to the inside surface of said second leg member.

11. The dowelling fixture of claim 7, wherein the dowel jig plate is formed of a transparent plastic material.

12. The dowelling fixture of claim 7, wherein the inside surface of the corner formed between said body member and said first leg member is undercut.

13. The dowelling fixture of claim 7, wherein the means for locking comprising a locking nut cooperating with threads found on the exterior of said means for guiding.

14. A drill guide comprising a body portion defining a throughbore therein, the outer surface of the body being at least partially threaded, a flanged base attached to one end of said body portion adjacent said at least partially threaded outer surface; and a nut matingly threaded on said at least partially threaded outer surface, wherein said nut is captured between said flanged base and an unthreaded portion of the outer surface of said body portion.

15. The drill guide of claim 14, further including a bushing adjacent said throughbore.

16. The drill guide of claim 14, wherein the flanged base and body portion are unitary.

17. The drill guide of claim 14, wherein the entire outer surface of the body portion is threaded.

18. The drill guide of claim 14, wherein the flanged base is welded to said body portion.

19. The drill guide of claim 14, wherein the flanged base is provided with means for biting into a workpiece.

* * * * *